United States Patent
Willard

(10) Patent No.: US 9,630,661 B1
(45) Date of Patent: Apr. 25, 2017

(54) RETRACTABLE ROOF STORED UNDER AN ACTIVE SPOILER

(71) Applicant: Magna Car Top Systems of America, Inc., Auburn Hills, MI (US)

(72) Inventor: Michael T. Willard, Harrison Township, MI (US)

(73) Assignee: MAGNA CAR TOP SYSTEMS OF AMERICA, INC., Auburn Hills, MI (US)

( * ) Notice: Subject to any disclaimer, the term of this patent is extended or adjusted under 35 U.S.C. 154(b) by 0 days.

(21) Appl. No.: 14/960,826

(22) Filed: Dec. 7, 2015

(51) Int. Cl.
  *B62D 35/00* (2006.01)
  *B60J 7/06* (2006.01)
  *B60J 7/047* (2006.01)
  *B60J 7/20* (2006.01)

(52) U.S. Cl.
  CPC ............ *B62D 35/007* (2013.01); *B60J 7/047* (2013.01); *B60J 7/20* (2013.01)

(58) Field of Classification Search
  CPC ..... B60J 7/06; B60J 7/061; B60J 7/062; B60J 7/20; B60J 7/201; B60J 7/22; B62D 35/007

USPC ............................................. 296/219, 107.08
See application file for complete search history.

(56) References Cited

U.S. PATENT DOCUMENTS

| 4,893,868 | A | * | 1/1990 | Miller | B60J 7/061 296/219 |
| 2009/0001773 | A1 | * | 1/2009 | Leopold | B60R 9/055 296/217 |
| 2010/0038932 | A1 | * | 2/2010 | Comfort | B60J 7/022 296/216.08 |

FOREIGN PATENT DOCUMENTS

| DE | 3828062 A1 | 3/1989 |
| DE | 102012106013 A1 | 1/2013 |
| FR | 2983130 A1 | 5/2013 |

* cited by examiner

*Primary Examiner* — Dennis H Pedder
(74) *Attorney, Agent, or Firm* — Brooks Kushman P.C.

(57) ABSTRACT

A retractable roof system for a vehicle that includes a sliding/folding textile cover. The cover is folded as the roof system retracts and is stored below a spoiler assembly. The spoiler is an active spoiler that is raised to receive the cover and lowered to enclose the cover in a storage compartment below the spoiler.

14 Claims, 3 Drawing Sheets

RETRACTABLE ROOF STORED UNDER AN ACTIVE SPOILER

TECHNICAL FIELD

This disclosure relates to a retractable flexible folding roof and active spoiler for a vehicle.

BACKGROUND

A sliding/folding roof is one type of retractable roof system for a vehicle. Sliding/folding roofs are used to cover wide openings without a supporting linkage. Another form of a retractable roof for a vehicle may be referred to as a panoramic sliding/folding roof. Sliding/folding roofs include a textile cover is supported by plates or ribs that are moved along tracks that extend in the longitudinal vehicle direction. The cover and ribs are collapsed into a folded arrangement when the roof is retracted. The folded roof is bulky, subject to wind noise, and causes additional drag for the vehicle.

Spoilers are wing-like parts that are provided to increase or decrease the down force on a vehicle to improve handling. Spoilers may also be provided on a vehicle for aesthetics. Spoilers may be static or may be provided with an actuator that controls the angular orientation of the spoiler and the amount of down force created by the spoiler. Active spoilers are normally spaced from the vehicle body to provide clearance for the movement of the spoiler wing. Static spoilers are normally fixedly secured to the deck lid of a vehicle and are essentially decorative. Active or static spoilers are normally single purpose structures that fail to provide any storage space below the spoiler wing.

This disclosure is directed to solving the above problems and other problems as summarized below.

SUMMARY

A retractable roof system is disclosed for a vehicle including a roof support structure defining an opening that is opened and closed by a foldable textile cover movable between a closed position covering the opening and an open position substantially uncovering the opening. A pair of tracks is provided on the lateral sides of the opening for guiding the cover between the open position and closed position. A drive mechanism is utilized to move the cover in the tracks. A spoiler is disposed over a rear portion of the opening that is attached to the roof support structure by a linkage. The linkage lifts the spoiler to receive the cover below the spoiler as the cover is moved toward the open position and lowers the spoiler to contain the cover in the open position.

According to other aspects of this disclosure, the drive mechanism may engage the linkage to lift the spoiler and lower the spoiler. The drive mechanism may be a cable drive that is moved by a drive motor that is used to extend and retract the cover.

A storage compartment may be disposed below the spoiler for receiving the cover as the drive mechanism retracts the cover and folds the cover into the storage compartment. The spoiler is lowered by the linkage to enclose the cover inside the storage compartment.

The linkage may be a four bar link that includes a front link, a rear link, the spoiler and the roof support structure. Other types of linkages may also be used to move the spoiler.

The spoiler may be raised by the linkage to unfold the cover from a storage compartment as the drive mechanism moves the cover from the open position to the closed position. The spoiler may be lowered by the linkage when the cover is in the closed position.

The cover, tracks, drive mechanism and spoiler may all be provided as parts of a sub-assembly that is secured to the roof support structure.

According to another aspect of this disclosure, a spoiler assembly is disclosed in combination with a roof of a vehicle. The combination includes a spoiler and a compartment defined by the vehicle roof. A linkage connects the spoiler to the vehicle roof and a bi-directional linear actuator is utilized to raise and lower the spoiler relative to the vehicle roof to open and close the compartment.

The above combination includes a roof closure assembly for a roof that defines an opening. The roof closure assembly is movable between a closed position covering the opening and an open position wherein the closure assembly is at least partially disposed in the compartment.

According to other aspects of the combination, the roof closure assembly may include a foldable membrane supported on a plurality of rigid supports that span the opening. The linkage may be a linkage that includes a front link, a rear link, a portion of the vehicle roof, and the spoiler. The bi-directional linear actuator may be a screw drive.

The above aspects of this disclosure and other aspects are described below in detail with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
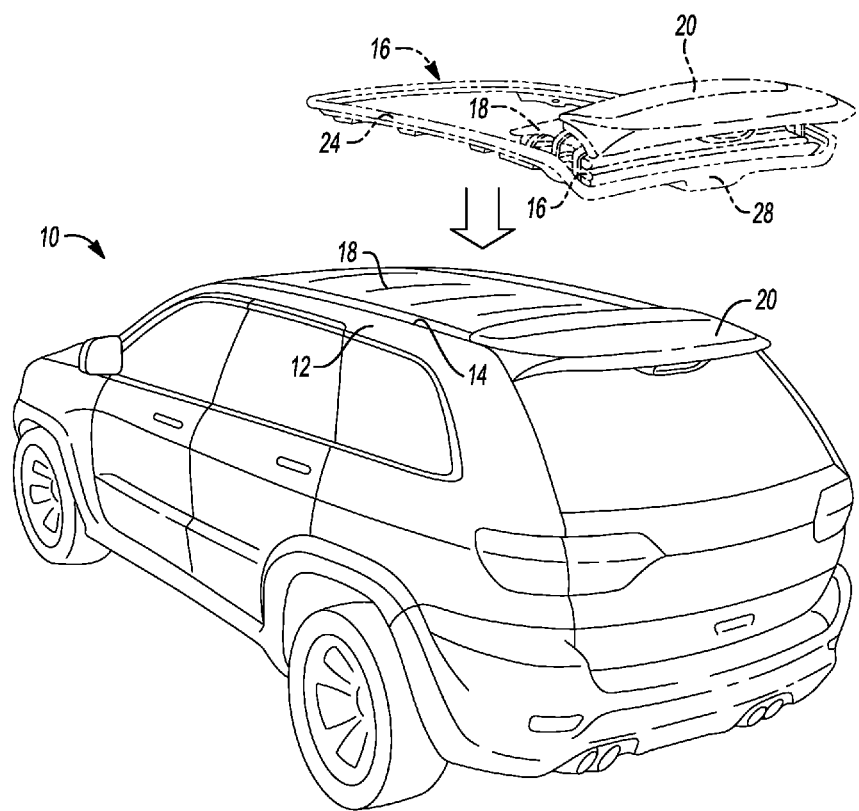
FIG. 1 is a rear/side perspective view of a vehicle with a sliding/folding roof and active spoiler subassembly shown as attached to the vehicle and also shown in phantom exploded away from the vehicle.

Referring to FIG. 1, a vehicle 10 is illustrated that includes a roof support structure 12 that defines an opening 14. A sliding/folding roof sub-assembly 16 is shown attached to the vehicle 10 and is also shown in phantom exploded away from the vehicle.

Figure 2:
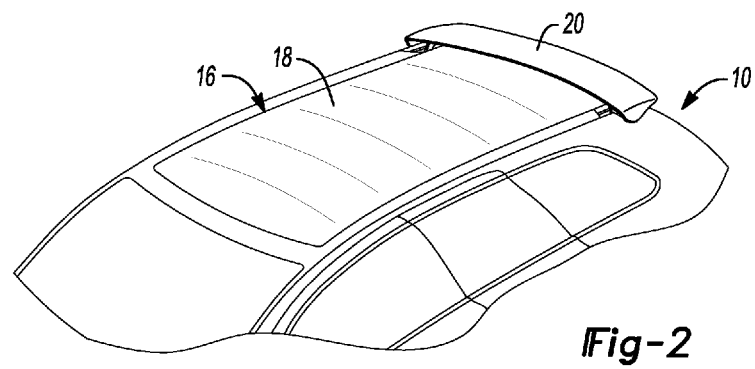
FIG. 2 is a front/side fragmentary perspective view of the vehicle and sliding/folding roof and active spoiler subassembly shown in FIG. 1 in a closed, or extended, position.
Figure 3:
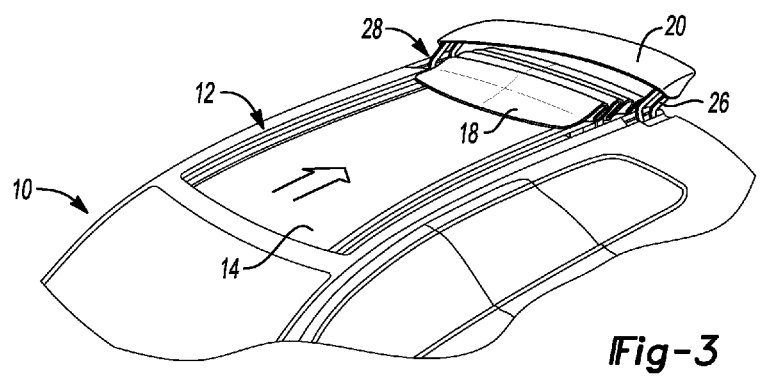
FIG. 3 is a front/side fragmentary perspective view of the vehicle and sliding/folding roof and active spoiler subassembly shown in FIG. 1 with the sliding/folding roof open and the spoiler in a raised position.
Figure 4:
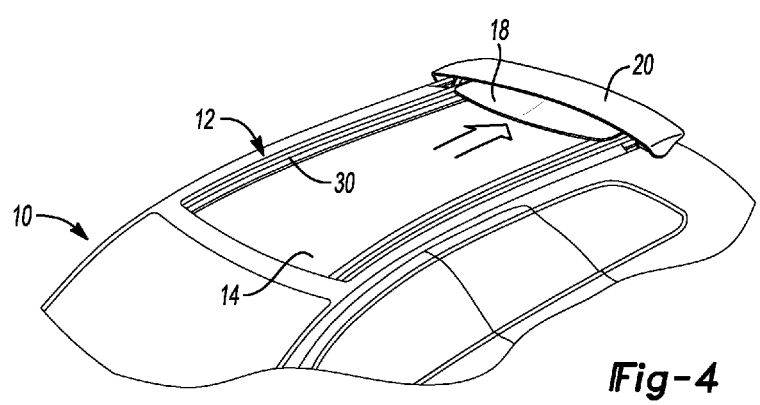
FIG. 4 is a front/side fragmentary perspective view of the vehicle and sliding/folding roof and active spoiler subassembly shown in FIG. 1 with the sliding/folding roof open and the spoiler in a lowered position.

The sliding/folding roof sub-assembly 16 includes a cover 18 that is foldable and movable between a closed or extended position (as shown in FIG. 2) and an open or retracted position (shown in FIGS. 3 and 4). A frame 24 is part of the sliding/folding roof sub-assembly 16 and is inserted in the opening 14 defined by the roof support structure 12. A linkage 26 connects the spoiler 20 to the frame 24. The linkage 26 may be a four bar link that is used to raise and lower the spoiler 20. A storage compartment 28 is provided below the spoiler 20 and is adapted to receive the cover 18 when it is folded and in its retracted position.

Referring to FIG. 2, the vehicle 10 is shown in part with the cover 18 in its extended, or closed, position and the spoiler 20 in its lowered position. The cover 18 is retractable, as shown in FIG. 3.

Referring to FIG. 3, the vehicle 10 is shown with the cover 18 folded rearwardly and in position under the spoiler 20. The spoiler 20 is in its raised position and is supported by the linkage 26. With the cover 18 retracted, the opening 14 defined by the roof structure 12 is uncovered and provides an open air passenger compartment for the vehicle 10.

Referring to FIG. 4, the vehicle 10 is partially shown with the cover 18 fully retracted and below the spoiler 20 that is in its lowered position. The spoiler 20 covers the folded cover 18 to provide a more aerodynamic vehicle 10. The cover 18 is moved along a track 30 between its extended or closed position shown in FIG. 2 and the retracted or open position shown in FIG. 4.

Figure 5:
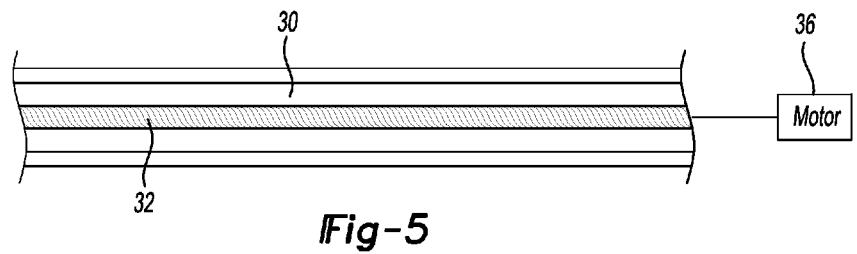
FIG. 5 is a fragmentary inside elevation view of one example of a track for the sliding/folding roof shown with a cable and drive motor.

Referring to FIG. 5, the track 30 is shown with a cable 32 that is used to move the cover 18 shown in the prior figures. Alternatively, a flexible drive, such as a chain, can be utilized instead of a cable 32. Rigid drive mechanisms may also be incorporated in the system such as a jack screw, a ball screw, a worm gear drive, or the like. A motor 36 is operatively connected to the cable 32. The motor 36 is a bidirectional drive motor that may be used to move the cable 32 along the track in either a fore-or-aft direction.

Figure 6:
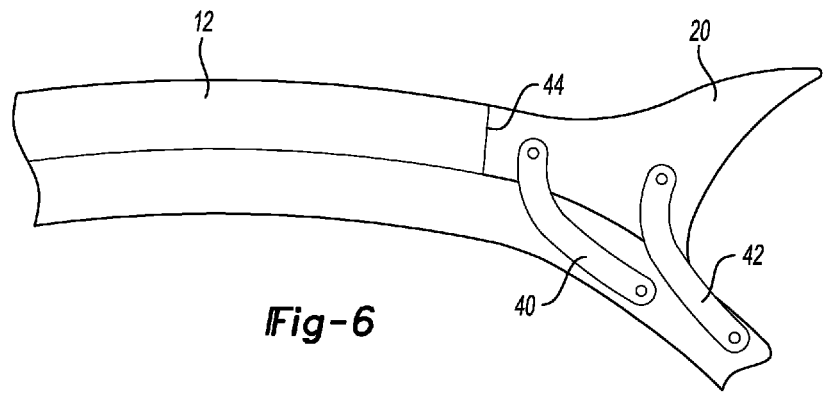
FIG. 6 is a fragmentary side elevation view of one example of the active spoiler, linkage and screw drive actuator in a lowered position.

Referring to FIG. 6, the roof support structure 12 is shown in a fragmentary view with the spoiler 20 in its lowered position. The spoiler 20 is connected to the roof support structure 12 by a front link 40 and a rear link 42 at a rear portion of the opening 44.

Figure 7:
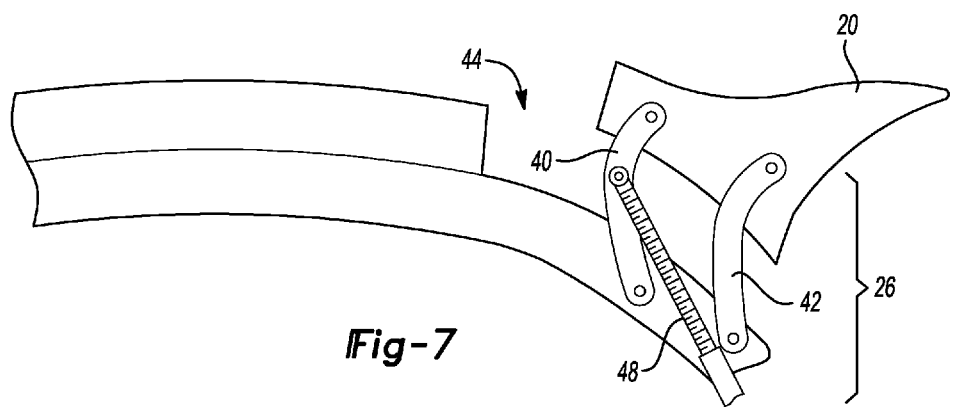
FIG. 7 is a fragmentary side elevation view of one example of the active spoiler, linkage and screw drive actuator in a raised position.

Referring to FIG. 7, the spoiler 20 is shown in its raised position with the front link 40 and rear link 42 supporting the spoiler 20 in its raised position. The front link 40 and rear link 42 are connected to the roof support structure 12 and to the spoiler 20. A screw drive 48 is connected between the linkage 26 and the roof support structure 12. The screw drive 48, as shown, is connected to the front link 40, but it should be understood that the screw drive 48 may be connected to the front link 40 or the rear link 42. When the spoiler 20 is in the raised position, it is spaced from the rear portion of the opening 44. With the spoiler 20 in the raised position, space is provided for receiving the cover 18 as it is folded into its retracted position. Once the cover 18 is folded and disposed below the spoiler 20, the spoiler 20 is closed by the screw drive 48 acting on the linkage 26.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A retractable roof system for a vehicle having a roof support structure defining an opening, the roof system comprising:
    a foldable textile cover movable between a closed position covering the opening and an open position substantially uncovering the opening;
    a pair of tracks provided on a pair of lateral sides of the opening for guiding the cover between the open position and closed position;
    a drive mechanism for moving the cover in the tracks; and
    a spoiler substantially co-extensive with and disposed over a cover storage compartment, the spoiler being disposed rearward of the opening and attached to the support, the spoiler being attached to the roof support structure by a linkage that lifts the spoiler to receive the cover below the spoiler as the cover is moved toward the open position, wherein the linkage lowers the spoiler to contain the cover in the cover storage compartment.

2. The retractable roof system of claim 1 further comprising:
    a linear-screw-drive mechanism wherein the linear-screw drive mechanism engages the linkage to lift the spoiler and lower the spoiler.

3. The retractable roof of claim 1 wherein the drive mechanism is a cable drive that is moved by a drive motor that is used to extend and retract the cover.

4. The retractable roof of claim 1 wherein as the cover retracts the cover is folded into the storage compartment and wherein as the cover is extended the cover is moved to the closed position and is not disposed below the spoiler.

5. The retractable roof of claim 4 wherein the spoiler is lowered by the linkage to enclose the cover inside the cover storage compartment.

6. The retractable roof of claim 1 wherein the linkage is a four bar link that includes a front link, a rear link, the spoiler and the roof support structure.

7. The retractable roof of claim 2 wherein the spoiler is raised by the linear-screw-drive mechanism and the linkage, wherein the cover is unfolded from the cover storage compartment as the drive mechanism moves the cover from the open position to the closed position.

8. The retractable roof of claim 7 wherein the spoiler is lowered by the linear-screw-drive mechanism and the linkage when the cover is in the closed position.

9. The retractable roof of claim 1 wherein the cover, tracks, drive mechanism, cover storage compartment and spoiler are provided as a sub-assembly that is secured to the roof support structure.

10. A spoiler assembly in combination with a roof of a vehicle roof comprising:
    a spoiler;
    a cover storage compartment and an opening each defined by the vehicle roof;
    the spoiler substantially co-extensive with the compartment,
    a linkage connecting the spoiler to the vehicle roof; and
    a bi-directional linear actuator for raising and lowering the spoiler relative to the vehicle roof to open and close the cover storage compartment.

11. The combination of claim 10 further comprising:
    a roof closure assembly, wherein the roof closure assembly is movable between a closed position covering the opening and an open position wherein the roof closure assembly is at least partially disposed in the cover storage compartment.

12. The combination of claim 11 wherein the roof closure assembly includes a foldable membrane supported on a plurality of rigid supports that span the opening.

13. The combination of claim 10 wherein the linkage is a four bar linkage including a front link, a rear link, a portion of the vehicle roof, and the spoiler.

14. The combination of claim 10 wherein the bi-directional linear actuator is a screw drive.

\* \* \* \* \*